US012793433B2

(12) United States Patent
Takano et al.

(10) Patent No.: US 12,793,433 B2
(45) Date of Patent: Nov. 10, 2026

(54) FEATURE IDENTIFICATION DEVICE AND FEATURE IDENTIFICATION METHOD

(71) Applicant: WOVEN BY TOYOTA, INC., Tokyo (JP)

(72) Inventors: Masaki Takano, Susono (JP); Yusaku Mandai, Tokyo-to (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 282 days.

(21) Appl. No.: 18/657,922

(22) Filed: May 8, 2024

(65) Prior Publication Data

US 2024/0395053 A1 Nov. 28, 2024

(30) Foreign Application Priority Data

May 25, 2023 (JP) ................................ 2023-086267

(51) Int. Cl.
*G06V 20/58* (2022.01)

(52) U.S. Cl.
CPC .................................... *G06V 20/58* (2022.01)

(58) Field of Classification Search
CPC .... G06V 20/58; G06V 20/588; G06V 10/764; G06F 16/29
See application file for complete search history.

(56) References Cited

U.S. PATENT DOCUMENTS

2017/0116477 A1* 4/2017 Chen .................. G01C 21/3819
2021/0101616 A1* 4/2021 Hayat .................... G01C 21/32
2021/0192815 A1 6/2021 Cui et al.

FOREIGN PATENT DOCUMENTS

JP 9-212791 A 8/1997
JP 2019048631 A * 3/2019
JP 2021-99489 A 7/2021

OTHER PUBLICATIONS

Blaga et al., A Method for Automatic Pole Detection from Urban Video Scenes using Stereo Vision, 2018, IEEE 14th Int. Conference on Intelligent Computer Communication and Processing, pp. 1-9. (Year: 2018).*

* cited by examiner

*Primary Examiner* — Kathleen M Broughton
(74) *Attorney, Agent, or Firm* — Sughrue Mion, PLLC

(57) ABSTRACT

A feature identification device identifies a type of lane separation equipment, including at least separation poles and separation wire ropes, for separating a road by travel direction. When the type of lane separation equipment is not associated with a predetermined position on the road, the device identifies the type of the lane separation equipment based on an image in which the lane separation equipment is captured at a predetermined position by an algorithm selected from a first algorithm and a second algorithm based on whether the predetermined position is included in the two-way traffic section. When the predetermined position is included in the two-way traffic section, the device identifies the type of the lane separation equipment using the second algorithm which is capable of identifying separation poles and separation wire ropes with higher certainty than the first algorithm.

6 Claims, 5 Drawing Sheets

FEATURE IDENTIFICATION DEVICE AND FEATURE IDENTIFICATION METHOD

FIELD

The present disclosure relates to a feature identification device and feature identification method for identifying the type of a feature shown in an image.

BACKGROUND

Map generation devices which collect, from a vehicle, peripheral images representing features surrounding the vehicle acquired by sensors installed in the vehicle, and which generate a high-precision map representing the features with high precision using feature information detected from surrounding images are known. The generated high-precision map is used for autonomous vehicle driving control. The features include lane separation equipment for separating the road surrounding the vehicle by travel direction.

The map generation device described in Japanese Unexamined Patent Publication (Kokai) No. 2021-99489 (PTL 1) detects candidate separation strip information from the street view image corresponding to the target road, and modifies the candidate separation strip information based on a preset modification policy.

In the map data update system described in PTL 1, a vehicle-mounted terminal obtains map data for update from a map update server and updates map data of the vehicle-mounted terminal. When update data after the start of a temporary road change is available, the map update server distributes the update data together with an instruction to temporarily use the update data. When update data after the end of a temporary road change is available, the map update server gives an instruction to use map data before the start of the temporary road change.

SUMMARY

Lane separation equipment includes, for example, separation poles, separation wire rope, and guardrails. Separation poles are a plurality of poles which are arranged at predetermined intervals, wherein each pole does not have a wire rope attached thereto. A separation wire rope is a wire rope which is installed on a plurality of poles arranged at predetermined intervals. Guardrails are a rail-like steel member installed on a plurality of poles arranged at predetermined intervals. In two-way traffic sections, such as temporary service sections, separation poles or separation wire ropes are often installed as lane separation equipment.

In such two-way traffic sections, in the event of an accident, separation poles are less likely to prevent vehicles from rolling into oncoming lanes than separation wire ropes or guardrails. In two-way traffic sections, it is preferable that the type of lane separation equipment be properly identified, and when the lane separation equipment is separation poles, it is preferable to maintain the same safety as when the lane separation equipment is not separation poles, for example, by controlling a vehicle so that it is less likely to veer into the oncoming lane.

In order to identify the type of lane separation equipment from a surroundings image, in particular, whether the equipment is separation poles or separation wire rope, it is necessary to detect the presence or absence of wire rope. However, since wire ropes generally have a long and narrow shape with a diameter of approximately 18 mm, it is difficult to properly detect them from images.

It is an object of the present disclosure to provide a feature identification device which can appropriately identify the type of lane separation equipment.

The following is a summary of the present disclosure.

(1) A feature identification device, including a memory for storing, in association with each position on a road, traffic information which indicates whether a position is included in a two-way traffic section, and lane separation equipment information representing at least whether lane separation equipment for separating the road by travel direction at the position is separation poles, which are a plurality of poles arranged at predetermined intervals and without wire rope, separation wire rope in which the wire rope is installed on a plurality of poles arranged at predetermined intervals, or something else, and a processor which is configured to identify a type of the lane separation equipment based on an image in which the lane separation equipment is captured at a predetermined position by a first algorithm which is capable of identifying a type of the lane separation equipment based on an image in which the lane separation equipment is captured when it is determined that the lane separation equipment information is not associated with the predetermined position on the road and that the predetermined position is not included in the two-way traffic section based on the traffic information, and identify the type of the lane separation equipment based on the image in which the lane separation equipment is captured in the predetermined position by a second algorithm which is capable of identifying the separation poles and the separation wire rope of the lane separation equipment with a higher certainty than the first algorithm when it is determined that the lane separation equipment information is not associated with the predetermined position and the predetermined position is included in the two-way traffic section based on the traffic information.

(2) The feature identification device according to (1) above, wherein the processor executes, as the first algorithm, at least detection processing for detecting an object from the image by inputting the image into a pre-trained detector, and first identification processing for identifying a type of the lane separation equipment based on a detected object, and as the second algorithm, at least the detection processing, and second identification processing for identifying the lane separation equipment as the separation wire rope when a plurality of the poles are detected by the detection processing, and three or more wires are detected from one of adjacent poles toward the other among the plurality of detected poles, and when each of the three or more wires is virtually extended so as to be continuous from one of the adjacent poles to the other, and the difference in interval between adjacent wires among the three or more extended wires is less than a predetermined error threshold.

(3) The feature identification device according to (2) above, wherein the processor, when the lane separation equipment information is associated with the predetermined position, identifies the type of the lane separation equipment based on an image in which the lane separation equipment is captured in the predetermined position by a third algorithm including the detection processing, the first identification processing, and type determination processing for determining whether the type of the lane separation equipment identified by the first identification processing is the same as the type represented in the lane separation equipment information.

(4) The feature identification device according to (2) or (3) above, wherein the processor, when the lane separation equipment information is associated with the predetermined position, identifies the type of the lane separation equipment based on an image in which the lane separation equipment is captured in the predetermined position by a third algorithm including the detection processing, the first identification processing, and appearance determination processing for determining whether an object detected in the detection processing has a baseline appearance of the lane separation equipment of the type represented in the lane separation equipment information associated with the predetermined position.

(5) A feature identification method, comprising storing, in a storage unit, traffic information which is associated with each position on a road and which indicates whether a position is included in a two-way traffic section, and lane separation equipment information representing at least whether lane separation equipment for separating the road by travel direction at the position is separation poles, which are a plurality of poles arranged at predetermined intervals and without wire rope, separation wire rope in which the wire rope is installed on a plurality of poles arranged at predetermined intervals, or something else, and identifying a type of the lane separation equipment based on an image in which the lane separation equipment is captured at the predetermined position by a first algorithm which is capable of identifying a type of the lane separation equipment based on an image in which the lane separation equipment is captured when it is determined that the lane separation equipment information is not associated with the predetermined position on the road and that the predetermined position is not included in the two-way traffic section based on the traffic information, and identifying the type of the lane separation equipment based on the image in which the lane separation equipment is captured in the predetermined position by a second algorithm which is capable of identifying the separation poles and the separation wire rope of the lane separation equipment with a higher certainty than the first algorithm when it is determined that the lane separation equipment information is not associated with the predetermined position and the predetermined position is included in the two-way traffic section based on the traffic information.

(6) A non-transitory computer-readable storage medium, on which there is stored a feature identification computer program which causes a computer to execute processing including identifying a type of lane separation equipment based on an image in which the lane separation equipment is captured at a predetermined position by a first algorithm which is capable of identifying the type of the lane separation equipment based on an image in which the lane separation equipment is captured when it is determined that lane separation equipment information is not associated with the predetermined position on a road and that the predetermined position is not included in a two-way traffic section based on traffic information representing whether the position is included in a two-way traffic section for each position on the road, wherein the lane separation equipment information represents, for each position on the road, at least whether the lane separation equipment for separating the road by travel direction at the position is separation poles, which are a plurality of poles arranged at predetermined intervals and without wire rope, separation wire rope in which the wire rope is installed on a plurality of poles arranged at predetermined intervals, or something else, and identifying the type of the lane separation equipment based on the image in which the lane separation equipment is captured in the predetermined position by a second algorithm which is capable of identifying the separation poles and the separation wire rope of the lane separation equipment with a higher certainty than the first algorithm when it is determined that the lane separation equipment information is not associated with the predetermined position and the predetermined position is included in the two-way traffic section based on the traffic information.

According to the feature identification device of the present disclosure, the type of lane separation equipment can be appropriately identified.

DESCRIPTION OF EMBODIMENTS

The feature identification device which can appropriately identify the type of lane separation equipment will be described in detail below with reference to the drawings. The feature identification device stores traffic information and lane separation equipment information in association with each position on a road in a map storage unit.

The traffic information is information indicating whether the position on the road is included in the two-way traffic section. The lane separation equipment information is information indicating at least whether the type of lane separation equipment for separating the road by travel direction at the position on the road is separation poles, separation wire poles, or something else. Separation poles are lane separation equipment consisting of a plurality of poles arranged at predetermined intervals, wherein each pole does not have a wire rope attached thereto. Separation wire rope is lane separation equipment in which wire rope is installed on a plurality of poles arranged at predetermined intervals.

Figure 1:
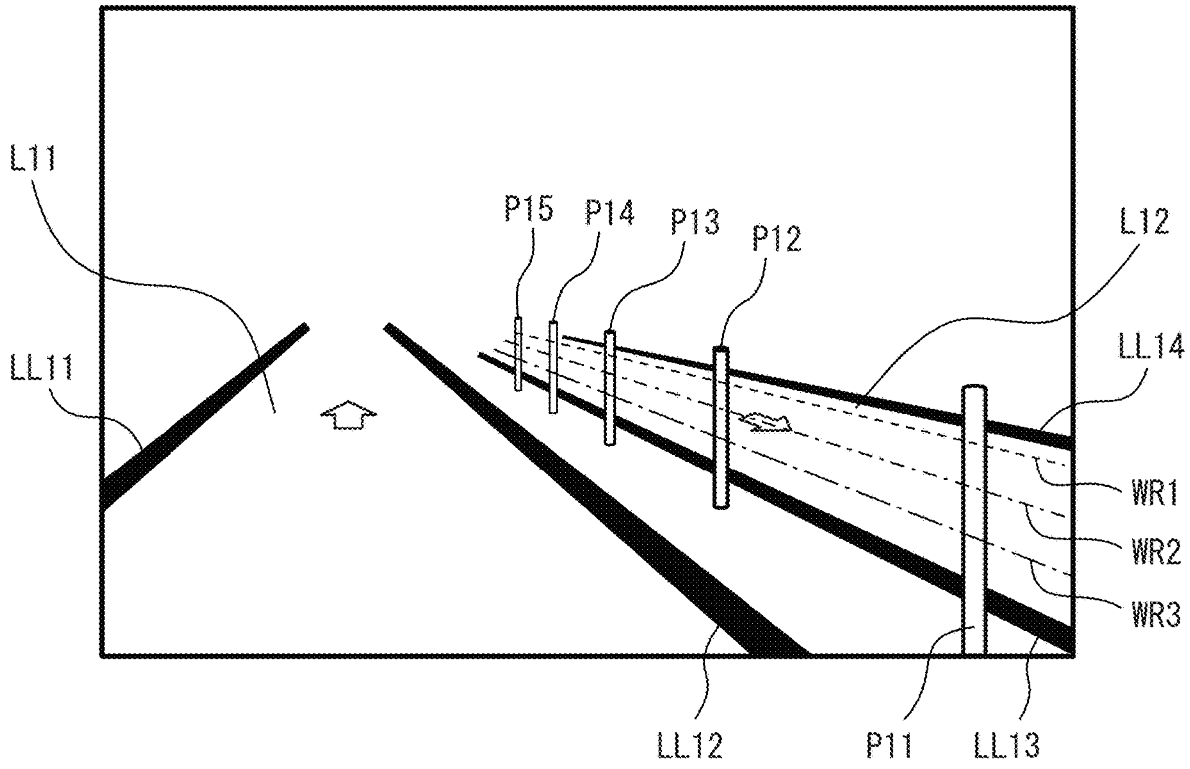
FIG. 1 is a schematic view illustrating a first example of lane separation equipment.
Figure 2:
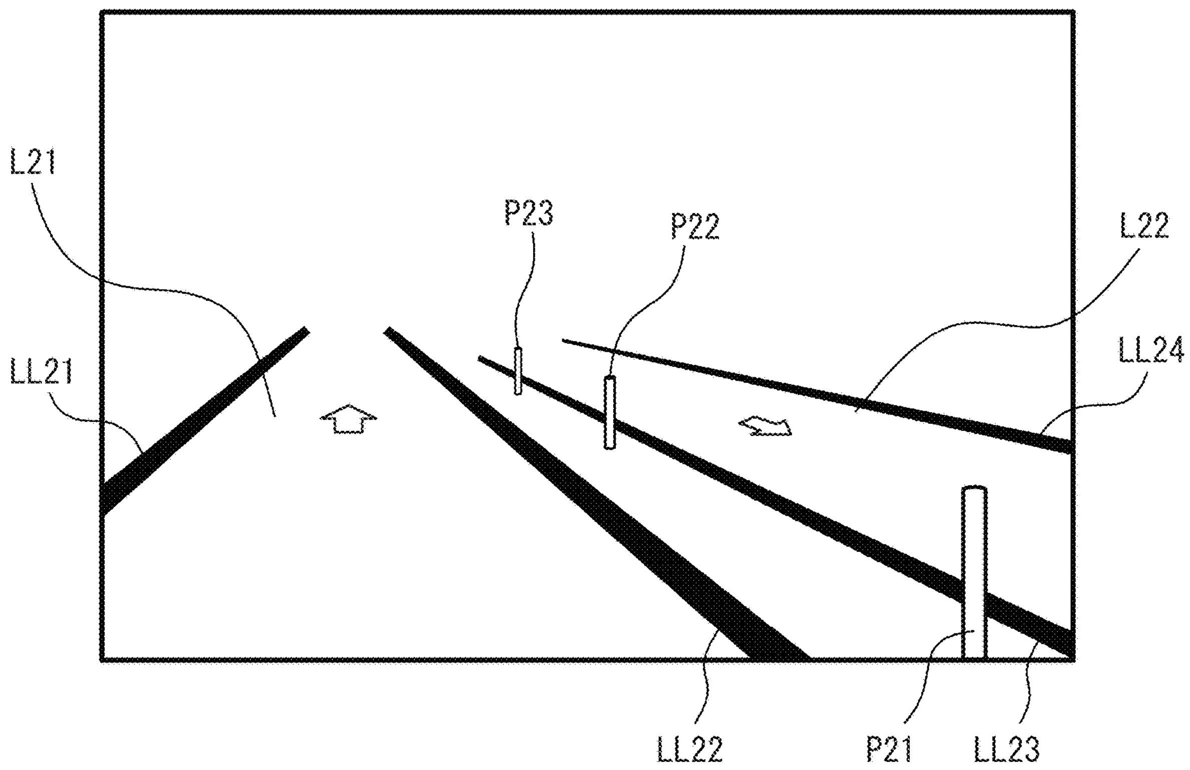
FIG. 2 is a schematic view illustrating a second example of lane separation equipment.

FIG. 1 is a schematic view illustrating a first example of lane separation equipment, and FIG. 2 is a schematic view illustrating a second example of lane separation equipment.

FIG. 1 shows a road having a lane L11 divided by lane marking lines LL11 and LL12, and a lane L12 divided by lane marking lines LL13 and LL14 and running in a direction different from the lane L11. The lanes L11 and L12 are separated by travel direction by poles P11 to P15 and wire ropes WR1 to WR3 installed on the poles P11 to P15. FIG. 1 shows a standard separation wire rope, which is lane separation equipment for separating the lanes L11 and L12. In the standard separation wire rope, the height of the poles P11 to P15 is, for example, approximately 1000 mm, and they are arranged at intervals of, for example, 4000 mm.

FIG. 2 shows a road having a lane L21 divided by lane marking lines LL21 and LL22, and a lane L22 divided by lane marking lines LL23 and LL24 and running in a direction different from the lane L21. Lanes L21 and L22 are separated by travel direction by poles P21 to P23. FIG. 2 shows standard separation poles, which are lane separation equipment for separating the lanes L21 and L22. In the standard separation poles, the height of the poles P21 to P23 is, for example, approximately 650 mm, and they are arranged at intervals of, for example, 10000 mm.

The feature identification device determines whether lane separation equipment information is associated with a predetermined position on the road. The feature identification device also determines whether the predetermined position is included in a two-way traffic section based on the traffic information.

When it is determined that lane separation equipment information is not associated with the predetermined position and the predetermined position is not included in the two-way traffic section, the feature identification device uses a first algorithm to identify the type of lane separation equipment based on an image in which the lane separation equipment is captured at the predetermined position. The first algorithm is an algorithm which is capable of identifying the type of the lane separation equipment based on an image of the lane separation equipment.

When it is determined that lane separation equipment information is not associated with a predetermined position and the predetermined position is included in a two-way traffic section, the feature identification device uses a second algorithm to identify the type of the lane separation equipment based on an image in which the lane separation equipment is captured at the predetermined position. The second algorithm is an algorithm which is capable of identifying separation poles and separation wire ropes of lane separation equipment with higher certainty than the first algorithm.

Figure 3:
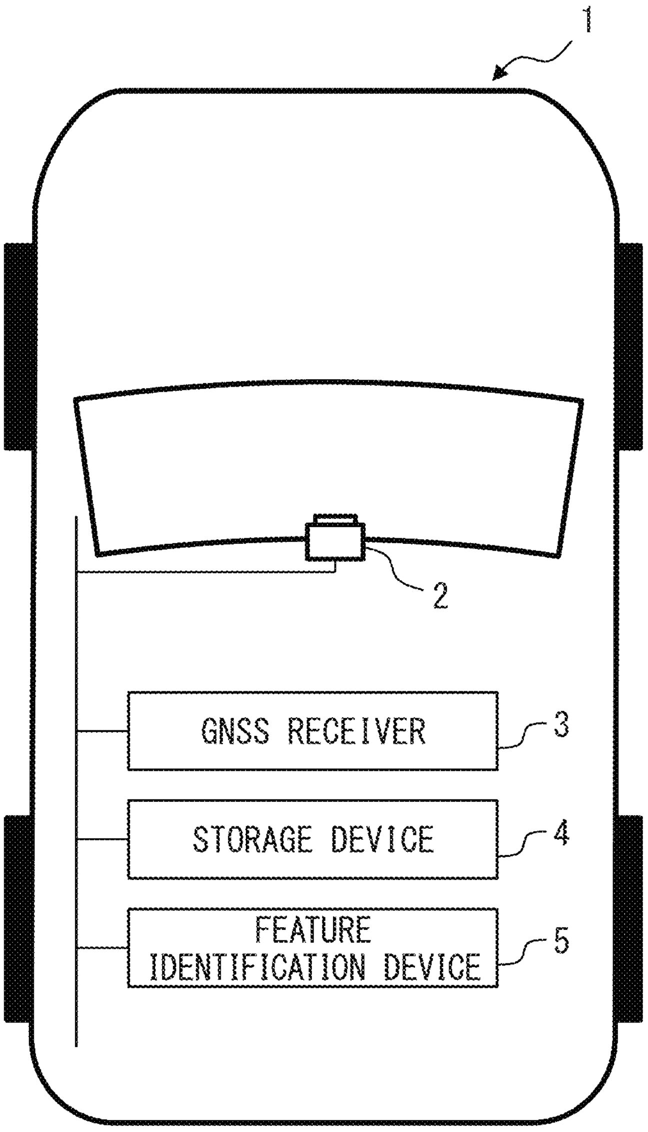
FIG. 3 is a schematic configuration view of a vehicle comprising a feature identification device.

FIG. 3 is a schematic configuration view of a vehicle comprising a feature identification device.

The vehicle 1 comprises a surroundings camera 2, a GNSS (Global Navigation Satellite System) receiver 3, a storage device 4, and a feature identification device 5. The surroundings camera 2, the GNSS receiver 3, the storage device 4, and the feature identification device 5 are communicably connected via an in-vehicle network which is compliant with a standard such as a controller area network.

The surroundings camera 2 is an example of a sensor for generating a surroundings image in accordance with the surroundings situation of the vehicle 1. The surroundings camera 2 includes a two-dimensional detector composed of an array of photoelectric conversion elements sensitive to visible light, such as CCD or C-MOS, and an imaging optical system which forms an image of the area to be photographed on the two-dimensional detector. The surroundings camera 2 is arranged, for example, in the upper front part of the vehicle interior, facing forward. The surroundings camera 2 captures images of the surroundings of the vehicle 1 through the windshield or rear glass at predetermined capture intervals (for example, $1/30$ seconds to $1/10$ seconds), and outputs surroundings images representing the surroundings. The surroundings image is an example of an image in which the lane separation equipment is captured.

The GNSS receiver 3 is an example of a positioning sensor, receives GNSS signals from GNSS satellites at predetermined intervals using a GNSS antenna (not illustrated), and measures the position of the vehicle 1 itself based on the received GNSS signals. The GNSS receiver 3 outputs a positioning signal representing the positioning result of the position of the vehicle 1 itself based on the GNSS signal to the feature identification device 5 via the in-vehicle network at predetermined intervals.

The storage device 4 is an example of a map storage unit, and includes, for example, a nonvolatile semiconductor memory or a hard disk device. The storage device 4 stores map information including traffic information and lane separation equipment information in association with each position on the road.

The traffic information is information indicating whether each position on the road is included in a two-way traffic section. The traffic information is represented by, for example, the coordinates of the starting points and ending points of two-way traffic sections.

The lane separation equipment information is information representing the type of lane separation equipment for separating the road by travel direction at each position on the road. The types of lane separation equipment include at least separation poles and separation wire rope. Separation poles are poles which are arranged at predetermined intervals and which do not have wire ropes attached thereto. Separation wire rope is a wire rope which is installed on a plurality of poles arranged at predetermined intervals.

The feature identification device 5 is an ECU (Electronic Control Unit) comprising a communication interface circuit, a memory, and a processor. The feature identification device 5 receives the surroundings image from the surroundings camera 2 via the communication interface, and identifies the type of the lane separation equipment shown in the surroundings image.

The feature identification device 5 acquires the surroundings image from the surroundings camera 2 via the communication interface circuit. The feature identification device 5 inputs the surroundings image to a classifier which has been trained in advance to detect features from images, and identifies the type of lane separation equipment based on objects detected from the surroundings image.

Figure 4:
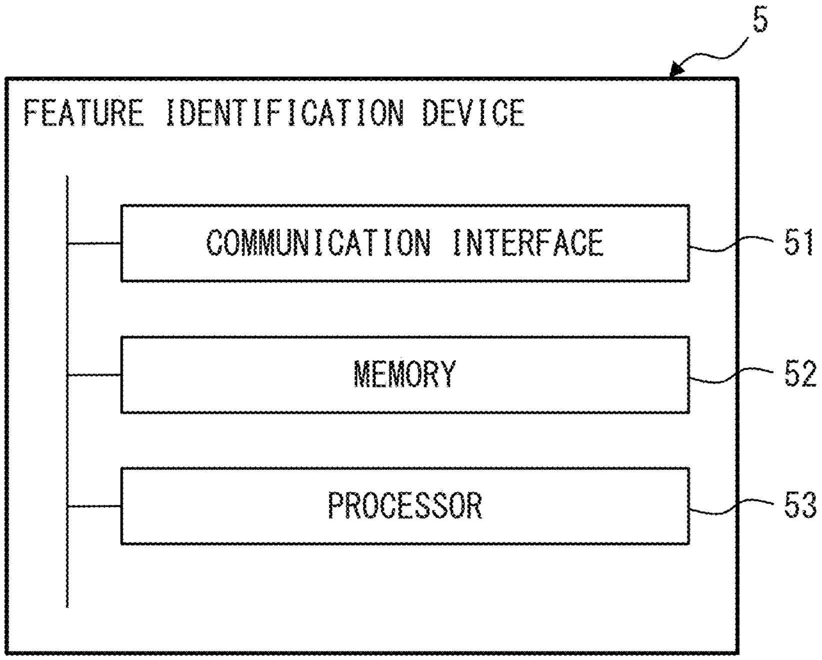
FIG. 4 is a hardware configuration view of a feature identification device.

FIG. 4 is a hardware schematic view of the feature identification device 5. The feature identification device 5 comprises a communication interface 51, a memory 52, and a processor 53.

The communication interface 51 is an example of a communication unit, and includes a communication interface circuit for connecting the feature identification device 5 to the in-vehicle network. The communication interface 51 supplies received data to the processor 53. Furthermore, the communication interface 51 outputs data supplied from the processor 53 to external devices The memory 52 is another example of a map storage unit, and includes a volatile semiconductor memory and a nonvolatile semiconductor memory. The memory 52 temporarily stores the map information read from the storage device 4. Furthermore, the memory 52 stores various data used in processing by the processor 53, such as processing contents executed as each of the first algorithm and the second algorithm. The memory 52 also stores various application programs, such as a feature identification computer program for causing a computer to execute a feature identification method.

The processor 53 is an example of a control unit, and includes one or more processors and peripheral circuits therefor. The processor 53 may further include other arithmetic circuits such as a logic arithmetic unit, a numerical arithmetic unit, or a graphics processing unit.

Figure 5:
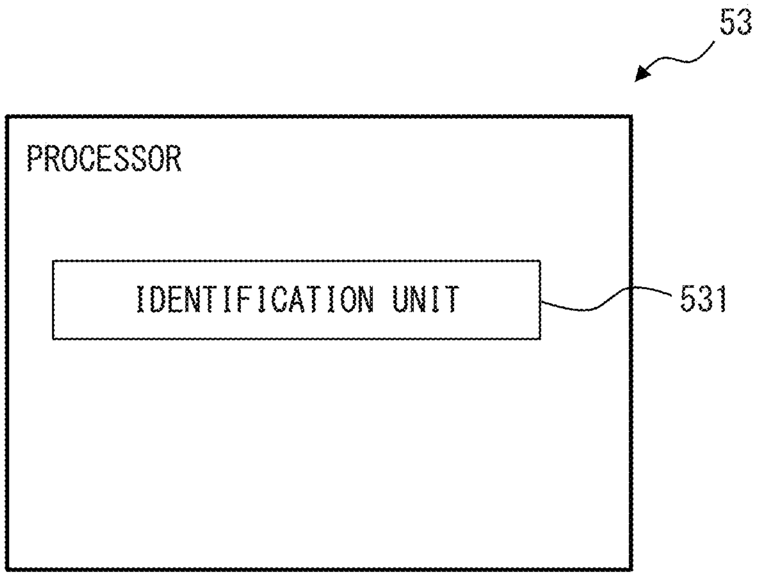
FIG. 5 is a functional block diagram of a processor included in a feature identification device.

FIG. 5 is a functional block diagram of the processor 53 included in the feature identification device 5.

The processor 53 of the feature identification device 5 has an identification unit 531 as a functional block. The identification unit 531 is a functional module implemented by a program executed by the processor 53. A computer program for implementing the functions of the identification unit 531 of the processor 53 may be provided in a form recorded on a computer-readable portable recording medium such as a semiconductor memory, a magnetic recording medium, or an optical recording medium. Alternatively, each of these units of the processor 53 may be implemented in the feature identification device 5 as independent integrated circuits, microprocessors, or firmware.

The identification unit 531 refers to the map information stored in the storage device 4 and determines whether lane separation equipment information is associated with a predetermined position on the road where the lane separation equipment was captured. Furthermore, the identification unit 531 refers to traffic information included in the map information stored in the storage device 4 and determines whether the predetermined position is included in a two-way traffic section.

The identification unit 531 identifies the type of the lane separation equipment based on a surroundings image in which the lane separation equipment is captured at the predetermined position. When the identification unit 531 identifies the type of lane separation equipment, different algorithms are used depending on whether lane separation equipment information is associated with the predetermined position and whether the predetermined position is determined to be included in a two-way traffic section.

When it is determined that lane separation equipment information is not associated with the predetermined position and the predetermined position is not included in a two-way traffic section, the identification unit 531 uses the first algorithm to identify the type of the lane separation equipment based on the surroundings image. The first algorithm is an algorithm which is capable of identifying the type of the lane separation equipment based on an image of the lane separation equipment.

The first algorithm includes, for example, detection processing for detecting the region and type of an object from an image, and first identification processing for identifying the type of the lane separation equipment based on the detected type.

The identification unit 531 performs detection processing by inputting the image to the classifier. The classifier uses a convolutional neural network (CNN), which has multiple convolutional layers connected in series from the input side to the output side, and which is trained in advance to detect regions and types corresponding to predetermined objects and features from images. By training the CNN in advance in accordance with a predetermined learning method such as the error backpropagation method using a large number of images representing objects used in lane separation equipment such as poles and wire ropes, and features such as lane markings, and the types of the objects as training data, the CNN operates as a classifier for detecting the regions and types of features such as objects used in lane separation equipment and lane markings.

In the first identification processing, when a wire rope is detected from the surroundings image and a pole is detected, the identification unit 531 identifies the type of the lane separation equipment as separation wire rope. Furthermore, in the first identification processing, when a wire rope is not detected from the surroundings image and a pole is detected, the identification unit 531 identifies the type of the lane separation equipment as separation poles.

When it is determined that lane separation equipment information is not associated with the predetermined position and the predetermined position is included in a two-way traffic section, the identification unit 531 uses the second algorithm to identify the type of the lane separation equipment based on the surroundings image. The second algorithm is an algorithm which is capable of identifying separation poles and separation wire ropes of the lane separation equipment with higher certainty than the first algorithm.

The second algorithm includes, for example, detection processing similar to the first algorithm and second identification processing.

In the second identification processing, the identification unit 531 determines whether a plurality of poles have been detected by the detection processing, and when a plurality of poles have been detected, it is determined whether three or more lines from one of the adjacent poles toward the other among the plurality of detected poles have been detected.

When three or more lines extending from one of the adjacent poles toward the other have been detected, the identification unit 531 extends each of the three or more lines so as to continue from one of the adjacent poles to the other.

Furthermore, the identification unit 531 determines whether the difference in interval between adjacent lines among the three or more extended lines is smaller than a predetermined error threshold. When it is determined that the difference in interval between adjacent lines is smaller than a predetermined error threshold, the identification unit 531 identifies the type of lane separation equipment as separation wire rope. The error threshold is set, for example, as the ratio (for example, ±10%) of the difference between the interval between two adjacent lines among the three or more lines and the interval between two other adjacent lines that are different from the interval, and is stored in advance in the memory 52. One of the two adjacent lines and one of the other two adjacent lines may be the same line.

The type of the lane separation equipment identified by the first algorithm or the second algorithm can be used for autonomous driving control of the vehicle 1 by a travel control device (not illustrated) mounted in the vehicle 1. For example, when the type of lane separation equipment is identified as separation poles, the travel control device controls the travel so that the speed of the vehicle 1 is lower than when the type of lane separation equipment is identified as separation wire rope.

When lane separation equipment information is associated with a predetermined position, the identification unit 531 uses a third algorithm to identify the type of lane separation equipment based on the surroundings image.

The third algorithm includes, for example, the same detection processing and first identification processing as the first algorithm, and type determination processing for determining whether the type of the lane separation equipment identified in the first identification processing is the same as the type represented in the lane separation equipment information associated with the predetermined position.

In the type determination processing, when it is determined that the type of the lane separation equipment identified in the first identification processing is not the same as the type represented in the lane separation equipment information, the identification unit 531 identifies the lane separation equipment information associated with the position as lane separation equipment information to be updated.

The third algorithm may include, in place of the type determination processing or in addition to the type determination processing, appearance determination processing for determining whether the object detected in the detection processing has a baseline appearance of the type of the lane separation equipment represented in the lane separation equipment information associated with the predetermined position.

Baseline appearances for each type of lane separation equipment, such as separation wire rope and separation poles (for example, pole height and installation spacing), are stored in the memory 52 in advance. The identification unit 531 estimates the actual height of the area determined to be a pole based on, for example, the ratio between the length of a horizontal straight line passing through the lower end of the area determined to be a pole, separated by a pair of areas determined to be lane marking lines, and the actual length of the lane marking lines stored in the memory 52 in advance. Furthermore, the identification unit 531 estimates the actual length of the interval between regions determined to be poles based on, for example, a length of a horizontal straight line passing through the lower end of one of the regions determined to be a pole, separated by a pair of regions determined to be lane marking lines, a length of a horizontal straight line passing through the lower end of another region adjacent to one region separated by a pair of regions determined to be lane marking lines, the actual spacing of lane markings stored in the memory 52 in advance, and capture parameters such as the focal length of the imaging optical system of the surroundings camera 2 stored in the memory 52 in advance.

In the appearance determination processing, the identification unit 531 determines whether the object detected in the detection processing has a baseline appearance for each type of lane separation equipment stored in the memory 52. When it is determined that the object detected by detection processing does not have the baseline appearance of the type of the lane separation equipment represented by the lane separation equipment information associated with the predetermined position, the identification unit 531 identifies the lane separation equipment information associated with the position as lane separation equipment information to be updated.

The lane separation equipment information to be updated identified by the type determination processing or appearance determination processing in the third algorithm is transmitted to a map information management server (not illustrated) via the communication interface 51 and a data communication module (not illustrated) for communicating with external devices via a communication network. When the number or ratio of lane separation equipment information to be updated exceeds a predetermined update threshold, the map information management server creates map information with updated lane separation equipment information.

The detection processing of the first to third algorithms may include preprocessing including binarization of the image and thinning of the binarized image. The identification unit 531 can perform preprocessing by applying a known binarization filter and thinning filter to the surroundings image.

Figure 6:
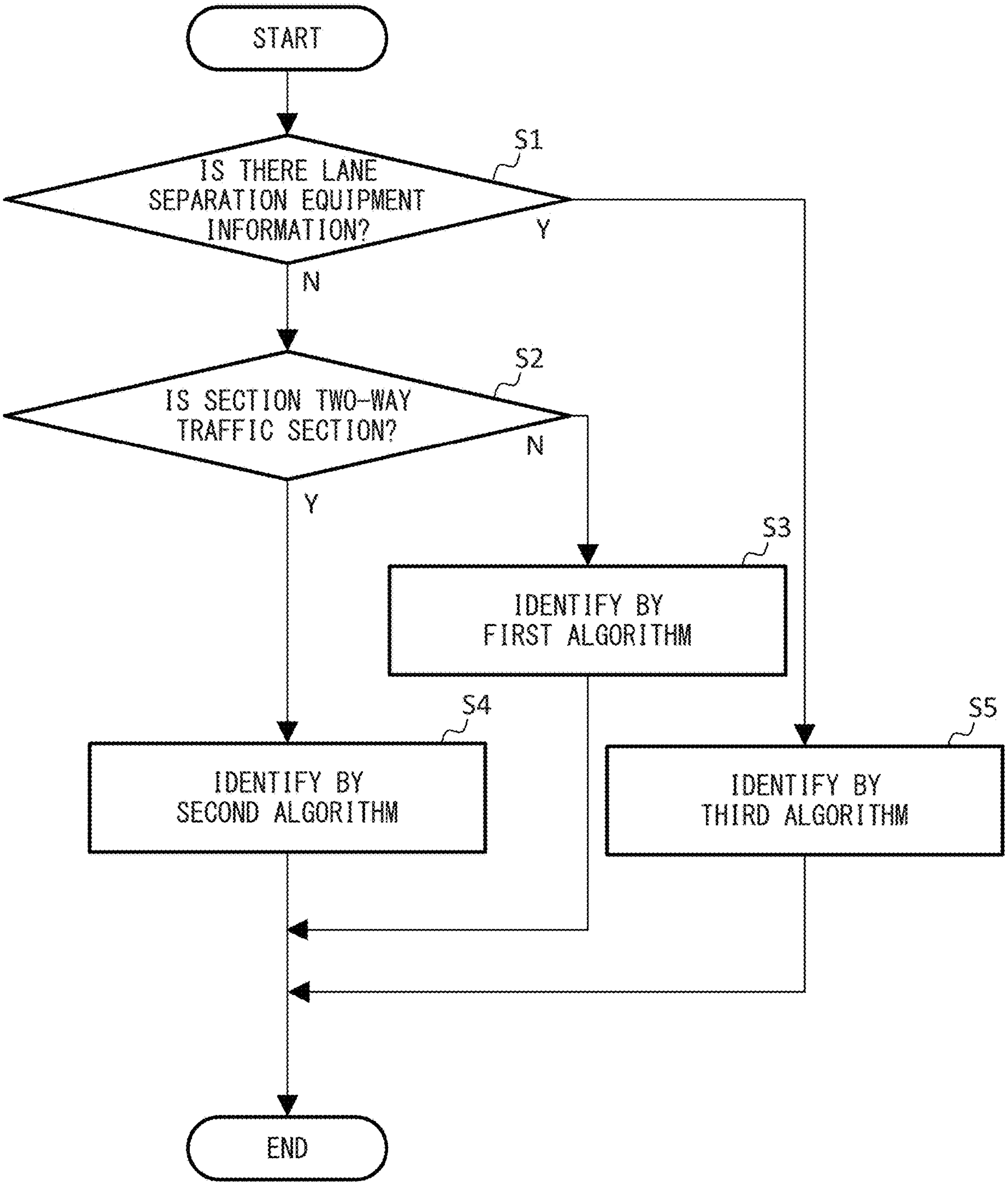
FIG. 6 is a flowchart of feature identification processing.

FIG. 6 is a flowchart of feature identification processing. The processor 53 of the feature identification device 5 executes the feature identification processing shown in FIG. 6 every time an image of the lane separation equipment is input.

First, the identification unit 531 of the processor 53 determines whether lane separation equipment information is associated with the predetermined position on the road where the lane separation equipment was photographed (step S1).

When it is determined that lane separation equipment information is not associated with the predetermined position (step S1: N), the identification unit 531 determines whether the predetermined position is included in a two-way traffic section (step S2).

When it is determined that the predetermined position is not included in a two-way traffic section (step S2: N), the identification unit 531 uses the first algorithm to identify the type of the lane separation equipment based on the image (step S3), and the feature identification processing ends.

When it is determined that the predetermined position is included in a two-way traffic section (step S2: Y), the identification unit 531 uses the second algorithm to identify the type of the lane separation equipment based on the image (step S4), and the feature identification processing ends.

When it is determined that lane separation equipment information is associated with the predetermined position (step S1: Y), the identification unit 531 uses the third algorithm to identify the type of the lane separation equipment based on the image (step S5), and the feature identification processing ends.

By performing feature identification processing in this manner, the feature identification device 5 can appropriately identify the type of the lane separation equipment.

In the present embodiment, an example in which the feature identification device is installed in a vehicle as an ECU has been described. However, the embodiments of the feature identification device are not limited to this. For example, the feature identification device may be implemented as a server which is capable of receiving a surroundings image from a vehicle. In this case, the surroundings image may be communicated from the vehicle to the server via a communication network, or may be communicated via a data medium. The type of the lane separation equipment identified by the feature identification device implemented as a server can be used to create map information by the map information management server. The created map information is distributed, for example, via a communication network, stored in the storage device 4 of the vehicle 1, and used for autonomous driving control of the vehicle 1.

A person skilled in the art would understand that various changes, substitutions, and modifications can be made without departing from the spirit and scope of the present disclosure.

What is claimed is:

1. A feature identification device, comprising:

a memory for storing, in association with each position on a road, traffic information which indicates whether a position is included in a two-way traffic section, and lane separation equipment information representing at least whether lane separation equipment for separating the road by travel direction at the position is separation poles, which are a plurality of poles arranged at predetermined intervals i) without wire rope or ii) with separation wire rope in which the wire rope is installed on the plurality of poles arranged the predetermined intervals, and a processor which is configured to identify a type of the lane separation equipment based on an image in which the lane separation equipment is captured at a predetermined position by a first algorithm which is capable of identifying a type of the lane separation equipment based on an image in which the lane separation equipment is captured when it is determined that the lane separation equipment information is not associated with the predetermined position on the road and that the predetermined position is not included in the two-way traffic section based on the traffic information, and identify the type of the lane separation equipment based on the image in which the lane separation equipment is captured in the predetermined position by a second algorithm which is capable of identifying the separation poles and the separation wire rope of the lane separation equipment with a higher certainty than the first algorithm when it is determined that the lane separation equipment information is not associated with the predetermined position and the predetermined position is included in the two-way traffic section based on the traffic information.

2. The feature identification device according to claim 1, wherein the processor executes, as the first algorithm, at least detection processing for detecting an object from the image by inputting the image into a pre-trained detector, and first identification processing for identifying a type of the lane separation equipment based on a detected object, and as the second algorithm, at least the detection processing, and second identification processing for identifying the lane separation equipment as the separation wire rope when a plurality of the poles are detected by the detection processing, and three or more wires are detected from one of adjacent poles toward the other among the plurality of detected poles, and when each of the three or more wires is virtually extended so as to be continuous from one of the adjacent poles to the other, and the difference in interval between adjacent wires among the three or more extended wires is less than a predetermined error threshold.

3. The feature identification device according to claim 2, wherein the processor, when the lane separation equipment information is associated with the predetermined position, identifies the type of the lane separation equipment based on an image in which the lane separation equipment is captured in the predetermined position by a third algorithm including the detection processing, the first identification processing, and type determination processing for determining whether the type of the lane separation equipment identified by the first identification processing is the same as the type represented in the lane separation equipment information.

4. The feature identification device according to claim 2, wherein the processor, when the lane separation equipment information is associated with the predetermined position, identifies the type of the lane separation equipment based on an image in which the lane separation equipment is captured in the predetermined position by a third algorithm including the detection processing, the first identification processing, and appearance determination processing for determining whether an object detected in the detection processing has a baseline appearance of the lane separation equipment of the type represented in the lane separation equipment information associated with the predetermined position.

5. A feature identification method, comprising:

storing, in a memory, traffic information which is associated with each position on a road and which indicates whether a position is included in a two-way traffic section, and lane separation equipment information representing at least whether lane separation equipment for separating the road by travel direction at the position is separation poles, which are a plurality of poles arranged at predetermined intervals i) without wire rope or ii) with separation wire rope in which the wire rope is installed on the plurality of poles arranged at the predetermined intervals, identifying a type of the lane separation equipment based on an image in which the lane separation equipment is captured at the predetermined position by a first algorithm which is capable of identifying a type of the lane separation equipment based on an image in which the lane separation equipment is captured when it is determined that the lane separation equipment information is not associated with the predetermined position on the road and that the predetermined position is not included in the two-way traffic section based on the traffic information, and identifying the type of the lane separation equipment based on the image in which the lane separation equipment is captured in the predetermined position by a second algorithm which is capable of identifying the separation poles and the separation wire rope of the lane separation equipment with a higher certainty than the first algorithm when it is determined that the lane separation equipment information is not associated with the predetermined position and the predetermined position is included in the two-way traffic section based on the traffic information.

6. A non-transitory computer-readable storage medium, on which there is stored a feature identification computer program which causes a computer to execute processing including:

identifying a type of lane separation equipment based on an image in which the lane separation equipment is captured at a predetermined position by a first algorithm which is capable of identifying a type of the lane separation equipment based on an image in which the lane separation equipment is captured when it is determined that lane separation equipment information is not associated with the predetermined position on the road and that based on traffic information which indicates, for each position on the road, whether the position is included in a two-way traffic section, the predetermined position is not included in the two-way traffic section, wherein the lane separation equipment information represents, for each position on the road, at least whether the lane separation equipment for separating the road by travel direction at the position is separation poles, which are a plurality of poles arranged at predetermined intervals i) without wire rope or ii) with separation wire rope in which the wire rope is installed on the plurality of poles arranged at the predetermined intervals, and identifying the type of the lane separation equipment based on the image in which the lane separation equipment is captured in the predetermined position by a second algorithm which is capable of identifying the separation poles and the separation wire rope of the lane separation equipment with a higher certainty than the first algorithm when it is determined that the lane separation equipment information is not associated with the predetermined position and the predetermined position is included in the two-way traffic section based on the traffic information.

* * * * *